July 30, 1968     F. A. WOOD ET AL     3,394,487
ANIMAL AND WILD GAME TRAP
Filed Oct. 18, 1965
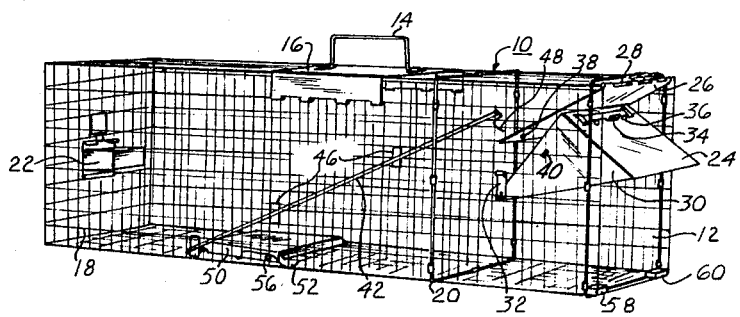
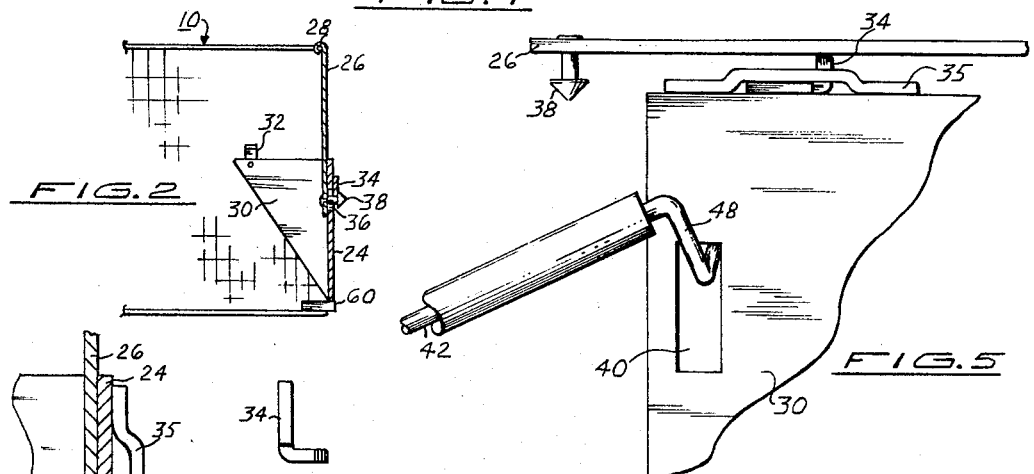
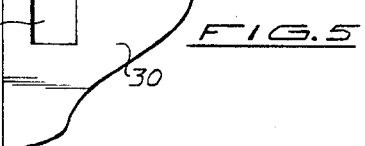
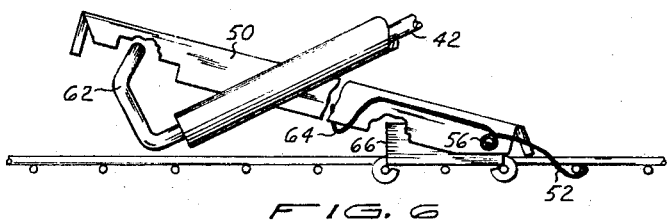
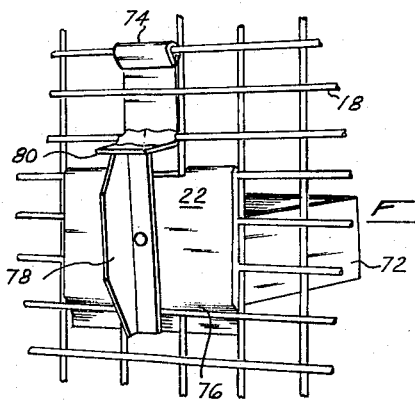
INVENTORS
FRED A. WOOD &
JOSEPH A. GORDON
BY United States Patent Office 3,394,487
Patented July 30, 1968

3,394,487
ANIMAL AND WILD GAME TRAP
Fred A. Wood, 2916 Broadway 92102, and Joseph A. Gordon, 2536 University Ave. 92104, both of San Diego, Calif.
Filed Oct. 18, 1965, Ser. No. 496,809
9 Claims. (Cl. 43—61)

ABSTRACT OF THE DISCLOSURE

An animal enclosure having an entrance that is capable of being closed by a door having two pivotally mounted separate pieces in which the two pieces move gravitationally and separately within the trap from a position adjacent the top of the entrance, to close the entrance. The door pieces have cooperating latch members for holding the pieces in entrance closing position. A trigger and latch releasably hold the door pieces adjacent the top of the entrance.

Background of the invention

There are several known traps that are used with varying degrees of effectiveness in trapping animals and wild game. These traps close the entrance with a door that either slides vertically or pivots into position inside the trap; and thus swings through a large volume area of the trap to close the entrance. As is well known to those who use traps, the vertically sliding door in the open position projects above the trap and flags the position of the trap and its existence to wild game and makes animals or wild game extremely wary of entering the trap. The pivoting door is equally bad in that when the animal enters the trap and trips the door, the pivoting member then swings though the volume of the trap; which volume may be occupied by the animal. Thus the pivoting door is likely to contact the animal. This alerts the animal to his predicament and may allow the animal to escape the trap by holding the door open and backing out of the trap.

In our prior Patent No. 3,200,534, issued Aug. 17, 1965 we disclosed and claimed an animal and game trap having a door mechanism for gravitationally closing the entrance while maintaining the volume of the trap substantially open and not having the door, in the open position, project outside the trap. That invention concerned an effective trap. This invention having an entirely different door construction, is an improvement thereover. We believe this invention may be manufactured more cheaply and constructed more simply, than our prior patented trap; and the single locking mechanism of this invention is more positive in operation. Further the resilient means for supporting the trip pan is also a novel improvement over our prior invention.

It is therefore an object of this invention to provide a new and improved animal and game trap.

It is another object of this invention to provide an improved and novel animal and game trap over that animal and game trap disclosed in our Patent No. 3,200,534.

It is another object of our invention to provide a novel and improved positive locking mechanism for the door in the closed position that is simple in construction and operation.

It is another object of this invention to provide a locking mechanism that animals held in the trap cannot release.

It is still another object of this invention to provide a novel and improved game feeding tray and means for mounting same.

To accomplish the foregoing our trap generally comprises in the specific embodiment a wire enclosure having a substantially vertical entrance opening at one end thereof. The opening is closed by a door having two pieces that are pivoted into mating position to form a substantially flat closure of the opening. When the entrance is open, then the two pieces are pivoted around their pivotal connections to the trap enclosure, to a location where both pieces are in a horizontal plane substantially against the upper surface of the trap enclosure. Thus the two pieces of the door are out of the main volume of the trap and yet do not project into the entrance or outside the trap itself. The lower piece of the door is supported by a rod support that projects from the door to a point midway of the trap and adjacent the floor. The door supporting rod supports the lower piece of the door that in turn supports the upper piece of the door.

When the game to be trapped depresses the trip pan, the pan rotates the door supporting rod causing the lower piece of the door to pivot clockwise into the closed position. The upper piece of the door no longer being supported by the lower piece of the door pivots in a counterclockwise direction into a flat overlapping contact with the lower piece and thereby closes the entrance. A coordinating locking means between the two pieces holds the pieces in the closed position until appropriately released by the trapper. A spring member holds the pan of the game actuatable means in spaced position above the lower portion of the rod member so that vibration of the trap caused by animals hitting the outside of the trap will not cause jarring or bouncing of the pan member on the support member and thus cause premature release of the door to move gravitationally to the closed position.

The exact nature of our invention as well as other objects and advantages will be readily apparent from consideration of the following specification relating to the drawing in which:

FIGURE 1 is a side view perspective of an embodiment of this invention.

FIGURE 2 is a partial side view partly in cross-section of the trap entrance that is closed by the two piece door.

FIGURE 3 is a cross-section of one of the locking mechanisms for locking the two piece door in the closed position.

FIGURE 4 is a side view of the locking bar member.

FIGURE 5 is a partial view showing the lower piece of the door being held in the upper position by the upper end of the supporting rod.

FIGURE 6 is a partial side view with parts broken away of the animal-actuated, door-release, pan member and the lower end of the door release rod member.

FIGURE 7 is a perspective view of the feed tray for the trap in the mounted position.

Referring now to FIGURE 1, the trap comprises a rectangular, box shaped enclosure 10 that is constructed of heavy gage wire 18. While the trap 10 may be made of other type materials such as sheet metal, wood or the like, it has been found that heavy wire construction is inexpensive, easy to shape, light weight and yet strong enough to retain more game. The trap has frames 20 that wrap around the trap and give it added support in the area adjacent the entrance 12. Secured to the upper surface of the trap is a sheet metal plate 16 that overlaps the sides and has a handle 14 for carrying the trap. At one end of the trap 10 is an entrance opening 12. At the opposite end is mounted a feed tray 22 that contains feed for enticing the animals and wild game to enter the trap.

The entrance 12 of the trap is a flat vertical opening that is closed by a flat door. The particular door of the specific embodiment of this invention comprises an upper flat piece of sheet metal that is the upper piece 26 of the door and a lower flat sheet metal member 24 that is the lower piece of the door. When in the closed position the upper piece 26 and the lower piece 24 overlap as shown in FIGURE 2 to form a flat composite door that closes the entrance 12.

The upper piece 26 is pivotally connected by hook portions 28 to the upper edge of the entrance to the trap. The upper piece 26 thus freely pivots from a horizontal position immediately adjacent the upper surface of the trap to a vertical position in the entrance 12. The lower piece 24 has sheet metal side projections 30 that are pivotally secured to an attachment member 32 that is secured to the side of the trap 10. Attachment 32 comprises a plate member that has each end hooked over the wires 18. It may thus be seen that the lower piece 24 pivots around pivot support 32 and because of the length of the extensions 30, rotates in a counterclockwise direction to a horizontal position that is immediately adjacent and parallel to the upper piece 26. In this upper position as shown in FIGURE 5, the lower piece 24 supports the upper piece 26 in the manner shown.

The lower piece 24 of the door has an aperture 40 through which a hook member 48 extends and holds the lower piece 24 in the upper position. A door supporting means comprises a rod member 42 that passes through a tubular sheath that is secured by brackets 46 to the side of the trap 10. The rod 42 extends from hook member 48 to a lower arm 62 that is positioned under trip pan 50. Trip pan 50 comprises a substantially flat sheet of metal that is pivotally supported at 56 on a supporting bracket 66. The pan member is spring biased to a tipped position by a spring 64 that encircles the pivot member 56 and projects under the pan in the manner shown. The spring normally supports the trip pan 50 in a spaced position about the end of arm 62. Since there is no contact between the trip pan and the arm, bouncing the trap by an animal will not sufficiently move the trip pan so as to move arm 62 sufficiently to release the door. However when the animal depresses the pan 50, the spring 64 is moved with the pan 50 into contact with arm 62, rotating rod 42 and pivoting projection 48 out of aperture 40. This releases the lower piece 24 to rotate to the closed position. This clockwise movement of the lower piece removes the support for the upper piece 26 that also then rotates in a counterclockwise direction into a flush overlapping contact with the lower piece 24.

The lower piece 24 has a pair of apertures 36 that are aligned to receive a pair of conical projections 38 mounted on piece 26. The projections 38 have conical heads and counterbored support members. The heads project through the apertures 36 as shown in FIGURE 3. The upper portion of the lower piece 24 has a sliding bar member 34 that is held at its ends by bracket members 35. The bracket members permit the bar member 34 to slide vertically. When bar 34 is upwardly against the upper extremity of the bracket members 35, then apertures 36 are opened. When in the bottommost position of brackets 35, bar member 34 closes apertures 36.

As may be seen, the conical projection members 38 pass through apertures 36 and the conical surfaces cam the bar member 34 vertically and out from over the apertures 36. After the conical members 38 have passed through the openings 36, the bar member then slides back off the conical heads and into the counterbore portion and locks the conical member 38 in its projected position through apertures 36 as shown in FIGURE 3. This locks the lower portion of the upper piece 26 to the top portion of the lower piece 24, and thus locks the door in the closed position.

When it is desired to open the trap, the bar member 34 is raised by the trappers hand away from the back of the conical member 38, and the conical member is moved out through apertures 36 and the upper piece 26 is pivoted in a clockwise direction to the position adjacent the upper surface of the trap. The lower piece 24 is then rotated in a counterclockwise direction to the point that projection 48 projects through aperture 40 and supports the lower piece 24 in a horizontal position adjacent the upper piece 26 and the upper portion of the trap 10.

The trap has in the wall opposite the entrance a novel animal and game feeding tray 72, that projects through an opening in the wires 18. The tray 72 has a flat vertical end member 22 with hook members on the upper surface for hooking over the upper wire of the opening. The lower part of the flat member has an angled shoulder 76 that terminates into a lower portion of the flat member 22. This lower shoulder 76 forms a seat for the feed member on wire 18 that has its upper portion hooked over the upper wire 18. In this position a center pivoting member 78 fixed to member 22 may be twisted by grasping its outwardly projecting member. The ends then project over the upper and lower wires 18 of the opening. This holds the trap 72 in a given fixed position. A spring biased member 80 that is held in position by pivoting clasp 74, projects downwardly and against the upper portion of the pivoting member 78 to frictionally hold pivoting member 78 in its vertical locking position.

In operation, the two pieces of the door are pivoted upward to a position where they both lie parallel to the upper portion of the trap and are held there by the end of rod member 48 projecting through aperture 40, as previously described. The animal enters the trap to reach the bait in the bait tray 22 and depresses the game actuatable member or plate 50 and by so doing depresses arm 62 and rotates rod 42 thereby rotating arm 48 out of aperture 40. This permits triangular members 30 and the flat door piece 24 to rotate in the clockwise direction and upper door plate 26 to rotate in a counterclockwise direction to mate in the flush locking position as shown in FIGURES 2 and 3. This closes the entrance with the animal or wild game trapped therein. The locking mechanism has locked and the game may not escape until such time as the trapper arrives and opens the door in the manner previously described.

Various modifications are contemplated and may obviously be resorted to by those skilled in the art without departing from the spirit and scope of the invention as herein defined by the appendant claims.

We claim:

1. A trap for trapping animals and wild game comprising,
   an enclosure having an entrance,
   a door for said entrance being gravitationally urged toward the closed position,
   and said door including two separate unconnected pieces separately and pivotally connected on horizontal axes to said enclosure at different places on said enclosure above the bottom thereof and that pivotally move within said enclosure and mate to form a composite door in said entrance.

2. A trap for trapping animals and wild game comprising,
   an enclosure having an entrance,
   a door for said entrance including two separate unconnected flat pieces separately and pivotally connected on horizontal axes to said enclosure at different places on said enclosure above the bottom thereof and that pivotally move within said trap in opposite rotational direction,
   and said pieces being positioned adjacent each other and the top of said enclosure when said entrance is open and being positioned in substantially the same plane in closing said entrance.

3. A trap for trapping animals and wild game comprising,
   an enclosure having an entrance,
   a two piece door for closing said entrance with each piece moving between open and closed positions and being gravitationally urged toward said closed position, one of said pieces being pivotally connected at the upper edge to a first support means secured to the upper edge of said entrance, the other of said pieces having a projection that is pivotally connected to a second support means, said second support means being supported by the sides of said trap at a point substantially midway the height of said entrance and spaced therefrom, and said pieces being parallel with each other and the top of said enclosure when in said open position and being pivoted in opposite rotational directions to a parallel position in closing said entrance.

4. A trap for trapping animals and wild game comprising, an enclosure having an entrance, a door for said entrance including two separate unconnected pieces separately and pivotally connected on horizontal axes to said enclosure at different places on said enclosure above the bottom thereof and that pivotally move by gravity within said trap to mate and form a composite door in said entrance, and said pieces pivoting between open and closed positions in opposite rotational direction.

5. A trap for trapping animals and wild game comprising, an enclosure having an entrance, a two piece door for closing said entrance with each piece being flat and moveable between open and closed positions, one of said pieces being pivotally connected at its upper edge to a first support means, the other of said pieces being pivotally supported by a second support means at a point substantially midway the height of said entrance, said two pieces pivoting by gravitational pull into mating position to close said entrance, the lower portion of said upper piece having at least two projecting members that project through apertures in the upper portion of said lower piece, said lower piece having a locking bar thereon for locking over the ends of said projecting member when projecting through said apertures for locking said lower piece and said upper piece in said mating position, support means for supporting said pieces in said open position, game actuated means in said enclosure for shifting said support means away from said supporting position in response to actuation by said game, and spring means for holding said game actuatable means in a spaced position from said support means.

6. A trap for trapping animals and wild game comprising, an enclosure having an entrance, a two piece door for closing said entrance, one of said pieces being pivotally supported at the upper edge, the other of said pieces being pivotally supported at a point substantially mid-way the height of said entrance and spaced therefrom toward the rear of said trap, said pieces being parallel with each other and the top of said enclosure when in the open position and being parallel when closing said entrance, the lower portion of said upper piece having at least one projection member that projects through an aperture in the upper portion of said lower piece, said lower piece having a locking bar means thereon for locking over the end of said projecting member when said projection member projects through said apertures for locking said lower piece and said upper piece in the closed positions.

7. A trap for trapping animals and wild game comprising, an enclosure having an entrance, a two piece door for closing said entrance with each piece moving between open and closed positions and being gravitationally urged toward said closed position, one of said pieces being pivotally connected at the upper edge to a first support means secured to the upper edge of said entrance, the other of said pieces having a projection that is pivotally connected to a second support means, said second support means being supported by the sides of said trap at a point substantially midway the height of said entrance and spaced therefrom, said pieces being parallel with each other and the top of said enclosure when in said open position and being pivoted in opposite rotational directions to a parallel position in closing said entrance, the lower portion of said upper piece having a plurality of projection members that project through apertures in the upper portion of said lower piece, said lower piece having a locking bar thereon for locking over the ends of said projecting members when projecting through said apertures for holding said lower piece and said upper piece in their mating positions, longitudinal third support means for supporting said pieces in said open position, game actuated means in said enclosure for rotating said third support means out of said supporting position in response to depression of said actuated means by said game, and spring means for holding said game actuatable means in a spaced position above said support means.

8. A trap for trapping animals and wild game comprising, a wire enclosure having an entrance for receiving animals and wild game, a bait box projecting through an opening in said wire enclosure and into said trap, said bait box comprising a horizontal box shaped member attached to a vertical flat member, said vertical member having a bottom offset portion for fitting over the bottom wire of said opening and resting thereon.

said vertical member having hook members at the upper edge for hooking over the top wire of said opening, pivoting means secured to said vertical member on the side opposite said box member for pivoting over the outside of said top and bottom wire members when vertical thereby holding said flat member in the vertical position, and spring means being attached to said wire enclosure adjacent one of the ends of said vertical member for frictionally holding said pivoting member in a vertical position.

9. A trap for trapping animals and wild game comprising, a wire enclosure having an entrance, a two piece door for closing said entrance with each piece moving between open and closed positions and being gravitationally urged toward said closed position, one of said pieces being pivotally connected at the upper edge to a first support means secured to the upper edge of said entrance, the other of said pieces having a projection that is pivotally connected to a second support means, said second support means being supported by the sides of said trap at a point substantially midway the height of said entrance and spaced therefrom, said pieces being parallel with each other and the top of said enclosure when in said open position and being pivoted in opposite rational directions to a parallel position in closing said entrance, the lower portion of said upper piece having a plurality of projection members that project through apertures in the upper portion of said lower piece, said lower piece having a locking bar thereon for locking over the ends of said projecting members when projecting through said apertures for holding said lower piece and said upper piece in their mating positions, longitudinal third support means for supporting said pieces in said open position, game actuated means in said enclosure for rotating said third support means out of said supporting position in response to depression of said actuated means by said game, spring means for holding said game actuatable means in a spaced position above said support means, a bait box projecting through an opening in said wire enclosure and into said trap, said bait box comprising a horizontal box shaped member attached to a vertical flat member, said vertical member having a bottom offset portion for fitting over the bottom wire of said opening and resting thereon, said vertical member having at its upper surface hook members at the upper edge for hooking over the top wire of said opening, pivoting means secured to said vertical member on the side opposite said box member for pivoting over the outside of said top and bottom wire members when vertical thereby holding said flat member in the vertical position, and spring means being attached to said wire enclosure adjacent one of the ends of said vertical member for fritcionally holding said pivoting member in a vertical position.

References Cited

UNITED STATES PATENTS

| | | | |
|---|---|---|---|
| 1,877,712 | 9/1932 | Zelma | 43—61 |
| 2,155,006 | 4/1939 | Cooper | 43—61 |
| 2,181,495 | 11/1939 | Novack | 119—18 X |
| 2,275,914 | 3/1942 | Lorenz | 119—18 X |
| 2,616,210 | 11/1952 | Reeb | 43—61 |
| 3,200,534 | 8/1965 | Wood et al. | 43—61 |

FOREIGN PATENTS

| | | |
|---|---|---|
| 1,199,911 | 6/1959 | France. |
| 299,282 | 8/1954 | Switzerland. |

WARNER H. CAMP, *Primary Examiner.*